Patented July 24, 1928.

1,678,015

UNITED STATES PATENT OFFICE.

ERNEST W. MELVIN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

METHOD OF MAKING INNER TUBES.

No Drawing. Application filed December 17, 1924. Serial No. 756,622.

My invention relates to the manufacture of inner tubes for pneumatic tires and more particularly to the forming of the raw tubes and the treatment of such tubes during vulcanization.

According to one conventional method the raw tube is formed by forcing warm plastic rubber through a circular die of a tubing machine. A suitable length of so formed tube is then drawn onto a cylindrical mandrel and wrapped with strips of fabric. The mandrel with the wrapped tube is then vulcanized in a suitable heater. The purpose of the wrapping is to hold the raw stock firmly against the mandrel and prevent the entrance of steam between the tube and mandrel during vulcanization.

It is among the objects of my invention to provide a method which does away with the necessity of wrapping the tubes which is a costly and time consuming operation and in which the stock is held on the mandrel with a uniform tension.

Other and further objects will be apparent from the following specification and claim.

In carrying out my improved method I tube the stock in a conventional tubing machine but to a diameter substantially less than the diameter of the mandrel upon which the tube is to be cured. I then stretch the raw tube onto the mandrel preferably by the application of compressed air between the tube and the mandrel. The tube when released onto the mandrel hugs the latter uniformly throughout its length and effectually prevents the entrance of steam between the tube and mandrel during vulcanization without the necessity of any wrapping. The vulcanization may be carried out in any conventional manner.

I claim:

The method of making inner tubes for pneumatic tires which comprises, tubing the stock to desired shape but of a cross sectional diameter less than the cross sectional diameter of the mandrel upon which it is to be cured by an amount such that when the tube is stretched upon the mandrel the tendency of the tube to hug the mandrel is sufficient by and of itself to prevent the penetration of the vulcanizing fluid between the tube and the mandrel, stretching the so formed tube onto the mandrel and subjecting the tube to vulcanization.

In testimony whereof I have signed my name to the above specification.

ERNEST W. MELVIN.